United States Patent
Joshi et al.

(10) Patent No.: US 8,238,321 B2
(45) Date of Patent: *Aug. 7, 2012

(54) TECHNIQUES FOR ACCESSING A WIRELESS COMMUNICATION SYSTEM WITH TUNE-AWAY CAPABILITY

(75) Inventors: Abhay Arvind Joshi, San Diego, CA (US); Ramin Rezaiifar, San Diego, CA (US); Simon Turner, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/940,886

(22) Filed: Nov. 5, 2010

(65) Prior Publication Data

US 2011/0044300 A1    Feb. 24, 2011

Related U.S. Application Data

(62) Division of application No. 11/282,064, filed on Nov. 16, 2005, now Pat. No. 7,848,305.

(51) Int. Cl.
*H04J 3/00* (2006.01)
(52) U.S. Cl. ........ 370/345; 370/331; 370/328; 455/434; 455/552.1; 455/553.1
(58) Field of Classification Search .................. 370/345, 370/328; 455/522, 434, 552.1–553.1
See application file for complete search history.

(56) References Cited

U.S. PATENT DOCUMENTS

| | | | |
|---|---|---|---|
| 6,614,768 B1 * | 9/2003 | Mahany et al. | 370/328 |
| 7,373,146 B2 | 5/2008 | Kong et al. | |
| 7,848,305 B2 * | 12/2010 | Joshi et al. | 370/345 |
| 2003/0054818 A1 | 3/2003 | Bahl et al. | |
| 2003/0144020 A1 * | 7/2003 | Challa et al. | 455/522 |
| 2003/0236103 A1 | 12/2003 | Tamaki et al. | |
| 2004/0120301 A1 * | 6/2004 | Kitchin | 370/345 |
| 2004/0208140 A1 | 10/2004 | Noguchi et al. | |
| 2005/0281227 A1 * | 12/2005 | Vedder et al. | 370/331 |
| 2008/0261648 A1 | 10/2008 | Tomizu | |

FOREIGN PATENT DOCUMENTS

| | | | |
|---|---|---|---|
| EP | 1467518 A1 * | 10/2004 | |
| JP | 2004032015 | 1/2004 | |

(Continued)

OTHER PUBLICATIONS

International Search Report and Written Opinion—PCT/US2006/004124, International Search Authority—European Patent Office—Jun. 30, 2006.

*Primary Examiner* — Amancio Gonzalez
(74) *Attorney, Agent, or Firm* — Kristine U. Ekwueme

(57) ABSTRACT

To access a first communication system, a terminal determines a transmission time for an access probe, an expected response time from the system, and a protected time interval based on the transmission time and/or expected response time. The terminal determines a starting time for sending the access probe such that the protected time interval does not overlap a tune-away interval in which the terminal is to monitor anther frequency/air-interface. This starting time may be set initially to the end of a prior access probe plus a pseudo-random wait duration and may be advanced forward or moved backward in time, if needed, by a time duration selected such that the protected time interval does not overlap the tune-away interval.

25 Claims, 8 Drawing Sheets

FOREIGN PATENT DOCUMENTS

| | | |
|---|---|---|
| JP | 2004112556 | 4/2004 |
| JP | 2006080839 | 3/2006 |
| WO | WO9806230 | 2/1998 |
| WO | WO0152567 | 7/2001 |
| WO | WO03047174 | 6/2003 |
| WO | WO2004091231 | 10/2004 |

* cited by examiner

TECHNIQUES FOR ACCESSING A WIRELESS COMMUNICATION SYSTEM WITH TUNE-AWAY CAPABILITY

CROSS-REFERENCE TO RELATED APPLICATIONS

The present application for patent is a divisional of U.S. patent application Ser. No. 11/282,064 filed Nov. 16, 2005 now U.S. Pat. No. 7,848,305, entitled "Techniques for Accessing a Wireless Communication System with Tune-Away Capability," and assigned to the assignee hereof.

BACKGROUND

I. Field

The present disclosure relates generally to communication, and more specifically to techniques for accessing and monitoring wireless communication systems.

II. Background

Wireless communication systems are widely deployed to provide various communication services such as voice, packet data, video, broadcast, messaging, and so on. These systems may be multiple-access systems capable of supporting communication with multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiplexing (OFDM), and Opportunity Driven Multiple Access (ODMA). A CDMA system may implement a radio access technology (RAT) such as Wideband-CDMA (W-CDMA) or cdma2000, which covers IS-2000, IS-856, and IS-95 standards. A TDMA system may implement a RAT such as Global System for Mobile Communications (GSM). These various RATs and standards are known in the art.

Some wireless communication systems are capable of providing voice and packet data services, which may be referred to as "data and voice" systems. One such system is a 1xEV-DV ("Evolution Data-Voice") system that implements IS-2000 and/or IS-95. Voice and packet data services have different characteristics. For example, voice service typically requires a common grade of service (GoS) for all users as well as relatively stringent delays. In contrast, packet data service may be able to tolerate different GoS for different users and variable delays. To support both voice and packet data services, the 1xEV-DV system may first allocate system resources to voice users and then allocate any remaining system resources to packet data users who are able to tolerate longer delays.

Some wireless communication systems are optimized for packet data service, which may be referred to as "data only" systems. One such system is a 1xEV-DO ("Evolution Data-Optimized") system that implements IS-856. Packet data transmission is typically characterized by long periods of silence punctuated by bursts of traffic.

A service provider may deploy multiple wireless communication systems to provide enhanced services for its subscribers. For example, the service provider may deploy a 1xEV-DV system to provide voice and packet data services for a large geographic area and may deploy a 1xEV-DO system to provide packet data service for areas where packet data usage is expected to be high. The coverage areas of the two systems typically overlap.

A hybrid terminal may be capable of communicating with the 1xEV-DV and 1xEV-DO systems. The terminal is typically able to receive service from one of the two systems at any given moment depending on the location of the terminal and the desired service. The terminal may have registered with the 1xEV-DV system and may be monitoring this system for page and other messages. The terminal may thereafter attempt to access the 1xEV-DO system to obtain packet data service. The terminal would then enter a 1xEV-DO access state and perform a sequence of tasks in order to access the 1xEV-DO system. During the time that the terminal is in the 1xEV-DO access state, the terminal is typically not able to monitor the 1xEV-DV system for page and other messages. Consequently, the terminal may miss an incoming call while attempting to access the 1xEV-DO system, which is highly undesirable.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Techniques for accessing a first communication system (e.g., a 1xEV-DO system) with tune-away capability to a second communication system (e.g., a 1xEV-DV system) are described herein. For clarity, these techniques are specifically described below for a 1xEV-DV system and a 1xEV-DO system.

In a preferred embodiment, the terminal determines a protected time interval for an access probe (request) to be sent to the first system and a starting time for sending the access probe such that the protected time interval does not overlap a tune-away interval in which the terminal is to be tuned away from the first system. The terminal then sends the access probe to the first system at the starting time.

In an embodiment, the terminal transmits at least one access probe in order to access the first system and may need to wait a pseudo-random time duration between access probes. The terminal may also need to tune its receiver to the second system at certain time intervals, which are called tune-away intervals, in order to receive page and other messages and/or to perform other tasks.

To access the first system, the terminal determines a transmission time for an access probe and an expected response time for an acknowledgment from the first system for the access probe. The terminal then determines a protected time interval for the access probe based on the transmission time and/or the expected response time. The protected time interval is the time interval in which the receiver is tuned to the first system and may be equal to the expected response time or the transmission time plus the expected response time. The terminal then determines a starting time (e.g., a starting access channel cycle) for sending the access probe such that the protected time interval does not overlap a tune-away interval in which the terminal is to tuned to the second system, e.g., to monitor a paging channel. This starting time may be initially set to the end of a prior access probe plus a pseudo-random wait duration. This starting time may be advanced forward or moved backward in time, if needed, by a time duration selected such that the protected time interval does not overlap the tune-away interval. The terminal then sends the access probe to the first system at the starting time. The terminal may tune to the second system prior to the tune-away interval, perform any required task on the second system, and then tune back to the first system at the end of the tune-away interval. The terminal may send each subsequent probe in similar manner.

Figure 1:
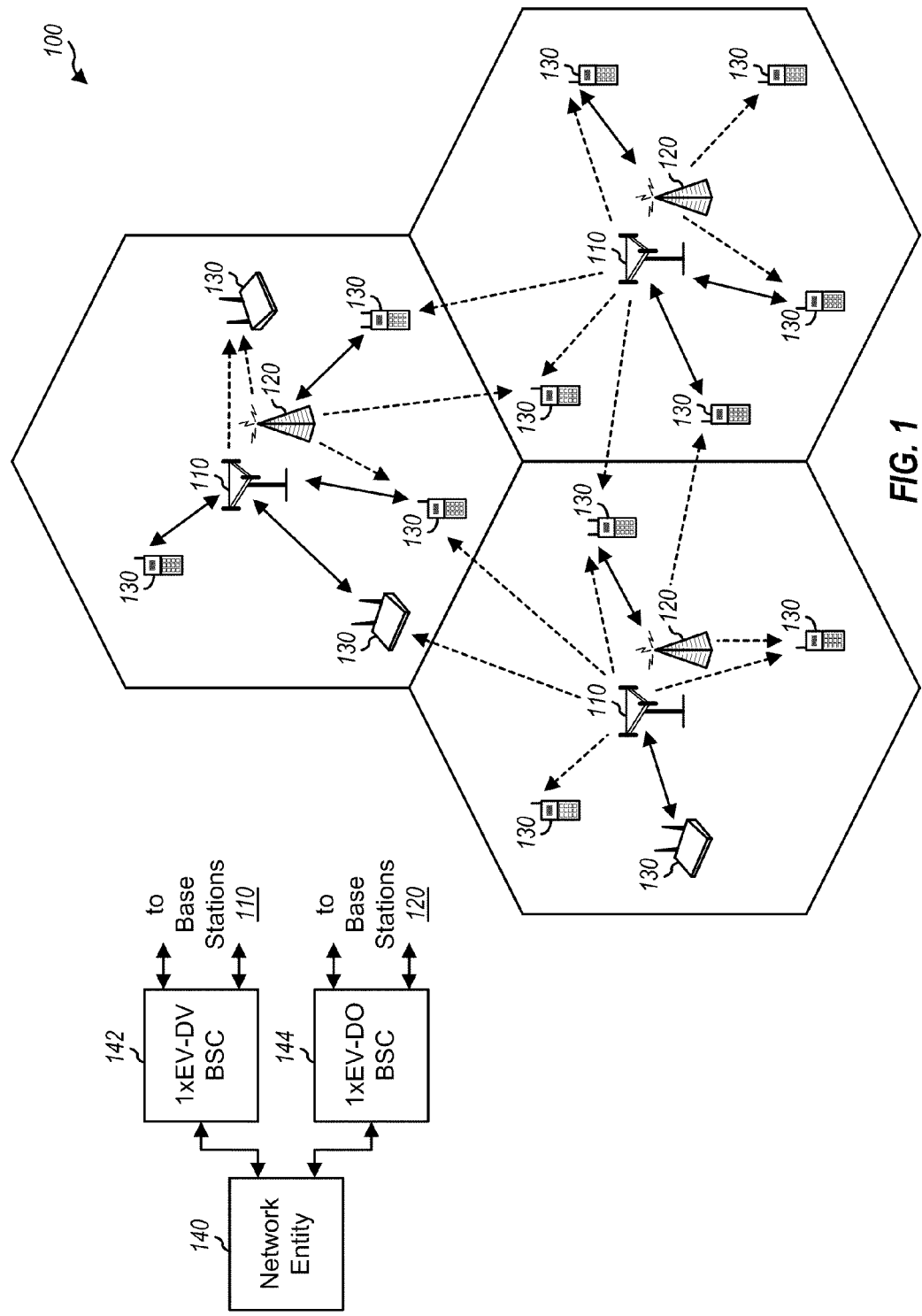
FIG. 1 shows a deployment with 1xEV-DV and 1xEV-DO systems.

FIG. 1 shows an exemplary deployment 100 whereby a 1xEV-DO system overlays a 1xEV-DV system. The 1xEV-DV system includes a number of base stations 110 that provide voice and packet data services for terminals 130 located within the coverage area of these base stations. Similarly, the 1xEV-DO system includes a number of base stations 120 that provide packet data service for terminals 130 located within the coverage areas of these base stations. Base stations 110 and 120 may be located at different sites or co-located at the same sites. A base station controller (BSC) 142 couples to base stations 110 and provides coordination and control for these base stations. Similarly, a BSC 144 couples to base stations 120 and provides coordination and control for these base stations. BSCs 142 and 144 may further couple to a network entity 140 that supports communication between the 1xEV-DV system and the 1xEV-DO system.

In general, a base station (1xEV-DV terminology) is a fixed station used for communicating with the terminals and may also be called an access point (1xEV-DO terminology), a Node B (W-CDMA terminology), a base transceiver station (BTS), or some other terminology. A terminal may be fixed or mobile and may also be called a mobile station (1xEV-DV terminology), an access terminal (1xEV-DO terminology), a user equipment (W-CDMA terminology), a wireless device, a subscriber unit, or some other terminology. In the description below, the term "base station" is used for a fixed station and the term "terminal" is used for a wireless device that communicates with the fixed station.

In FIG. 1, a solid line with arrows on both ends indicates communication between a terminal and a base station. A dashed line with an arrow on one end indicates reception of pilot and/or signaling by a terminal from a base station. A terminal may communicate with one or multiple base stations on the forward link and/or reverse link at any given moment. The forward link (or downlink) refers to the communication link from the base stations to the terminals, and the reverse link (or uplink) refers to the communication link from the terminals to the base stations.

A hybrid terminal may have registered with the 1xEV-DV system and may operate in an idle state when the terminal is not actively exchanging data with any base station in the 1xEV-DV system. In the idle state, the terminal typically monitors a paging channel (PCH) from the 1xEV-DV system for messages applicable to the terminal. Such messages may include page messages that alert the terminal to the presence of an incoming call and overhead messages that carry system and other information for the terminal.

In IS-2000 and IS-95, the paging channel is partitioned into PCH slots. Each PCH slot has a duration of 80 milliseconds (ms). A terminal is assigned one PCH slot in each slot cycle of $T_{SC}$ seconds, which is given as:

$$T_{SC}=1.28\times2^{SCI}, \qquad \text{Eq (1)}$$

where SCI is a slot cycle index that is applicable to the terminal and may be negotiated between the terminal and the system. The SCI can range from −4 to +7, and the slot cycle can range from 80 ms to 163.84 seconds, respectively. Each slot cycle contains $16\times2^{SCI}$ PCH slots that are assigned indices of 1 through $16\times2^{SCI}$. The terminal is assigned a specific PCH slot index that is determined by identification information for the terminal. This identification information may be an International Mobile Subscriber Identifier (IMSI) that is unique for each terminal, a Mobile Identification Number (MIN), an Electronic Serial Number (ESN), a Temporary Mobile Subscriber Identifier (TMSI), and so on. The PCH slot index for the terminal is fixed, and each PCH slot with that slot index is called an assigned paging slot. The terminal processes the assigned paging slot in each slot cycle since a message may be sent to the terminal in this paging slot.

Figure 2:
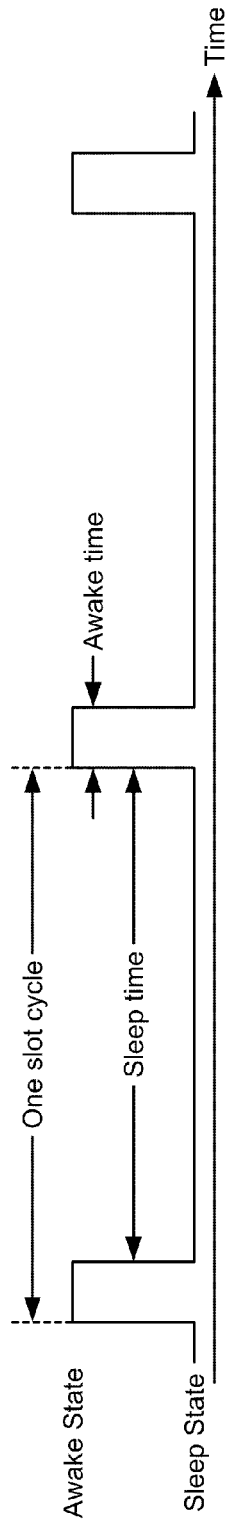
FIG. 2 shows a timeline for the paging channel in the 1xEV-DV system.

FIG. 2 shows a timeline for processing the paging channel by a terminal in the 1xEV-DV system. To conserve battery power in the idle state, the terminal may operate in a slotted mode whereby (1) the 1xEV-DV system sends messages to the terminal only in the assigned paging slots and (2) the terminal monitors the paging channel for messages during the assigned paging slots. In the slotted mode, the terminal transitions from a sleep state to an awake state prior to the assigned paging slot in each slot cycle, monitors the paging channel, and performs other functions to maintain the communication link with the 1xEV-DV system. The awake time denotes the time duration when the terminal is in the awake state, and the sleep time denotes the time duration when the terminal is in the sleep state. The awake time typically spans the assigned paging slot, any necessary setup and warm-up times for circuitry within the terminal, and software overhead and "clean up" time. The starts of the awake time for consecutive assigned paging slots are separated by $T_{SC}$ seconds.

A hybrid terminal can operate on both the 1xEV-DV and 1xEV-DO systems by time division multiplexing a single receiver. The hybrid terminal can maintain an active connection with the 1xEV-DO system to obtain packet data service and monitor the paging channel on the 1xEV-DV system. This may be achieved by (1) temporarily halting the 1xEVDO connection prior to each assigned paging slot on the 1xEV-DV system, (2) tuning the receiver to the 1xEV-DV system to receive the paging channel, and (3) tuning the receiver back to the 1xEV-DO system and resuming the 1xEVDO connection after processing the 1xEV-DV paging channel. Since the 1xEVDO connection is based on asynchronous bursts of data, temporary halts and resumptions of the 1xEVDO connection are virtually unnoticed by the user or applications running on the terminal. Using such techniques, the hybrid terminal can operate on the 1xEVDO system with minimum impact on monitoring of the 1xEV-DV paging channel.

The operation described above is for a case in which the hybrid terminal has already accessed the 1xEV-DO system and has established an active connection with the 1xEV-DO system. Conventionally, the terminal is not able to monitor the paging channel while attempting to access the 1xEV-DO system. The reason for this is because the terminal needs to perform a sequence of time-critical tasks in order to access the 1xEV-DO system, and tuning the receiver away to monitor the 1xEV-DV paging channel may disrupt this sequence of tasks, as described below.

The terminal enters a 1xEVDO access state and performs an access procedure in order to access the 1xEV-DO system. For the access procedure, the terminal transmits one or more access probes to the 1xEV-DO system. The 1xEV-DO system responds with an access channel acknowledgment (ACAck) message that acknowledges successful reception of an access probe from the terminal. IS-856 specifies the manner in which access probes can be transmitted.

In IS-856, access probes are transmitted on an access channel to the 1xEV-DO system. The access channel is divided into access channel cycles, with each access channel cycle having a configurable duration of $N_{acd}$ slots. Each slot has a duration of 1.667 milliseconds (ms) and is identified by system time $T_{sys\_s}$, which is given in units of slots. The access channel cycles start in slots in which $T_{sys\_s}$ mod $N_{acd}$=0, where mod denotes a modulo operation. An access probe can only be transmitted starting at a new access channel cycle but may span one or multiple access channel cycles.

In IS-856, no transmission is allowed on the reverse link during designated silence intervals, which occur periodically. Each silence interval has a configurable duration of $N_{SI}$ frames. Each frame has a duration of 26.67 ms (or 16 slots) and is identified by system time $T_{sys\_f}$, which is given in units of frames. The silence intervals start in frames in which $T_{sys\_f}$ mod $(2048 \times 2^{N_{SI}} - 1)$=0.

Figure 3:
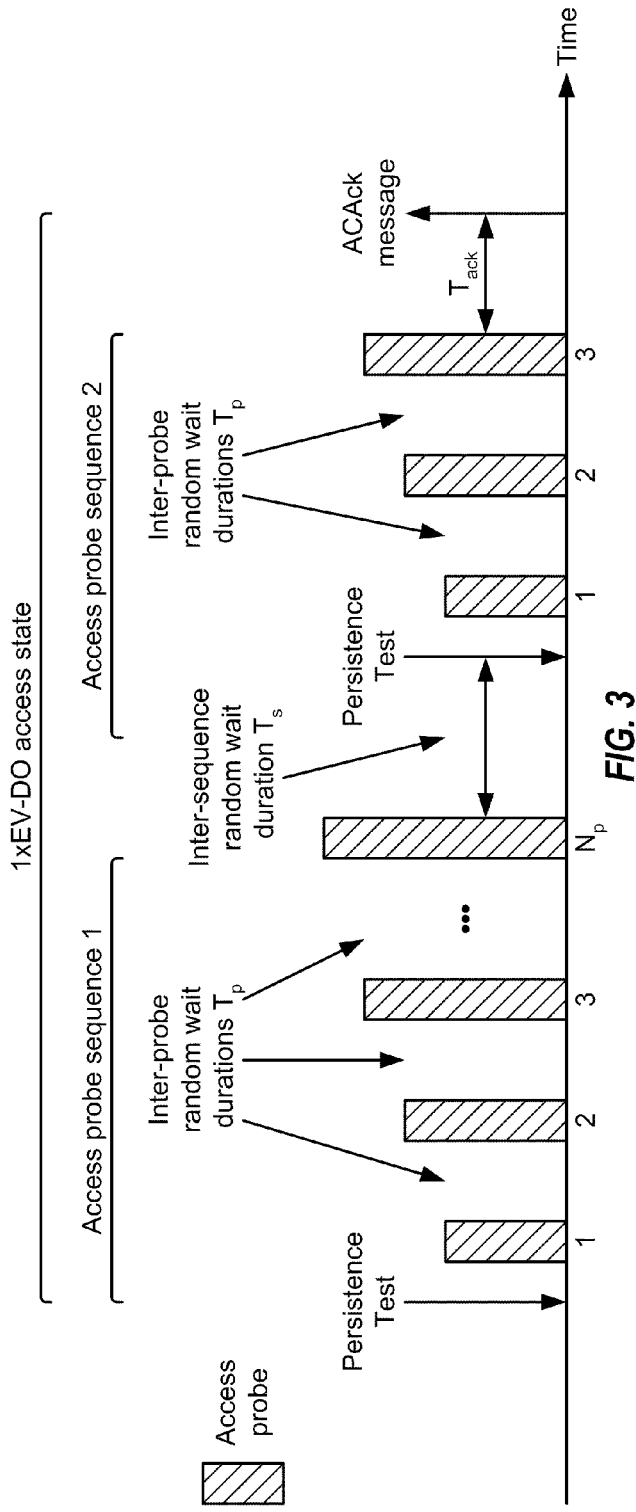
FIG. 3 shows a timeline for accessing the 1xEV-DO system.

FIG. 3 shows a timeline for accessing the 1xEV-DO system, which is called an access probe timeline. A terminal may transmit up to $N_s$ access probe sequences to the 1xEV-DO system and may transmit up to $N_p$ access probes for each access probe sequence, where $N_p$ and $N_s$ are configurable parameters.

The terminal performs a persistence test before starting the first access probe sequence. The persistence test is used to control congestion on the access channel. For the persistence test, the terminal generates a pseudo-random number x between 0 and 1, compares x against a threshold value q, and declares success if x is less than q, where q is a configurable parameter for each class of terminals. The terminal can start transmission of access probes if the persistence test succeeds or if 4/q consecutive persistence tests fail.

After passing the persistence test, the terminal transmits the first access probe on the access channel and then listens for an ACAck message from the 1xEV-DO system. If an ACAck message is not received, then the terminal waits a random duration of $T_p$ slots, counting from the end of the prior access probe. This random wait duration $T_p$ is also called an inter-probe backoff and is computed as follows. The terminal initially sets a variable $y_{total}$ to zero. The terminal then generates a pseudo-random integer number y that is uniformly distributed between 0 and $N_{pbo}$, where $N_{pbo}$ is the maximum wait duration (in units of access channel duration) between access probes. The terminal updates the $y_{total}$ variable as $y_{total} = y_{total} + y$ and then computes the random wait duration $T_p$ as follows:

$$T_p = T_{ack\_max} + y_{total} \times N_{acd} \qquad \text{Eq (2)}$$

where $T_{ack\_max}$ is the maximum amount of time to wait for an ACAck message before sending another access probe. $T_{ack\_max}$ is 128 slots in IS-856.

The terminal then determines the time interval in which the second access probe will be transmitted. If this probe transmission interval overlaps a silence interval, then the terminal transmits the access probe after the silence interval. This is achieved by generating a new pseudo-random number y, adding this new y to the current $y_{total}$, and computing the new random wait duration $T_p$. The terminal continues to increase the wait duration until the probe transmission interval does not overlap the silence interval. The terminal then transmits the second access probe $T_p$ slots after the end of the first access probe.

The terminal transmits each subsequent access probe in the first access probe sequence in the same manner, i.e., transmits the access probe, listens for an ACAck message, waits a random duration, and transmits another access probe. The terminal may transmit up to $N_p$ access probes for the first access probe sequence.

If the terminal transmits all $N_p$ access probes for the first access probe sequence and does not receive an ACAck message, then the terminal waits a random duration of $T_s$ slots before starting a second access probe sequence. The random wait duration $T_s$ is also called an inter-sequence backoff and is computed in similar manner as the inter-probe random wait duration $T_p$, except that the pseudo-random number y is uniformly distributed between 0 and $N_{sbo}$, where $N_{sbo}$ is the maximum wait duration between access probe sequences. The terminal then transmits the second access probe sequence in the same manner as the first access probe sequence. The terminal may transmit up to $N_s$ access probe sequences for the access procedure.

For the access procedure, the terminal continues to transmit access probes, one at a time, until either (1) an ACAck message is received from the 1xEV-DO system or (2) the maximum number of access probes has been transmitted. For the example shown in FIG. 3, the terminal receives an ACAck message $T_{ack}$ slots after sending the third access probe in the second access probe sequence. The terminal stops transmitting the access probes upon receiving this ACAck message. If the terminal has sent the maximum number of access probe sequences and still does not receive an ACAck message within $T_{ack\_max}$ slots after the last access probe, then the terminal exits the 1xEV-DO access state with a failure indication.

The access procedure described above indicates that the terminal performs a sequence of time-critical tasks for the access probe timeline. The terminal is not able to tune the receiver away to monitor the 1xEV-DV paging channel without possibly disrupting this access probe timeline. The terminal is not able to tune away to the 1xEV-DV system during the assigned paging slots because of (1) the random nature of the inter-probe wait durations $T_p$ and the inter-sequence wait durations $T_s$ and (2) the asynchronous nature of the ACAck message from the 1xEV-DO system.

Figure 4:
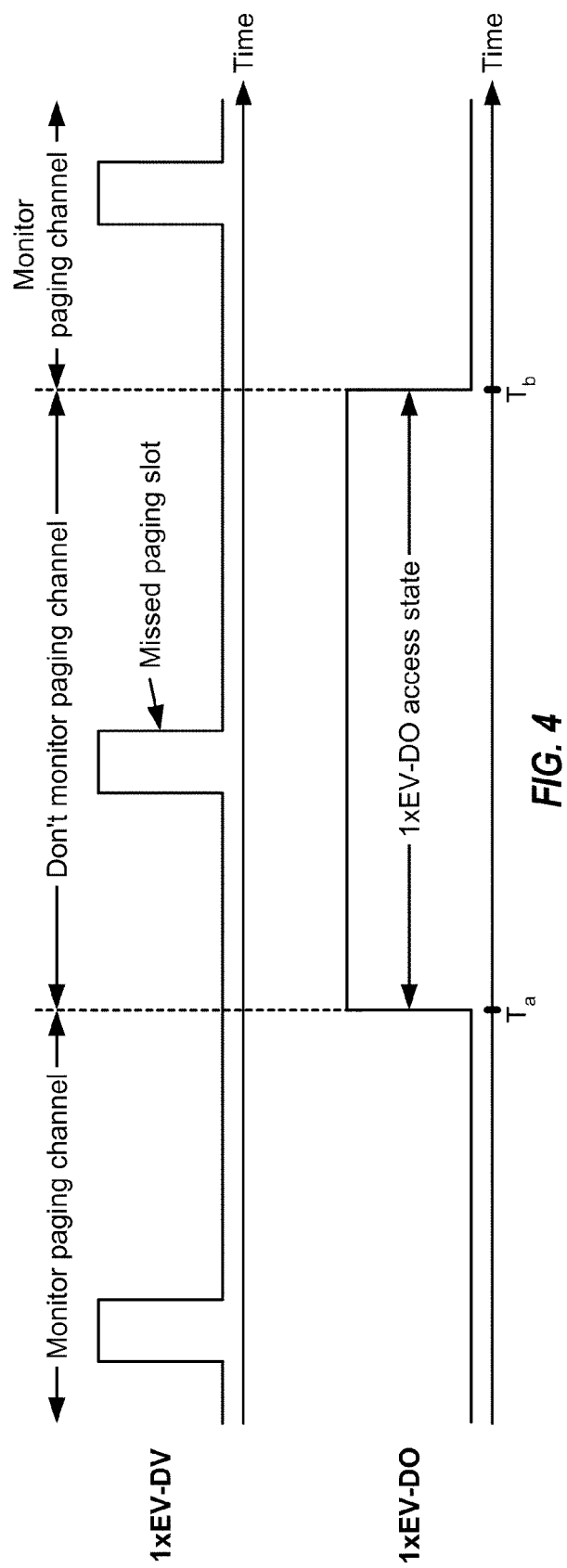
FIG. 4 shows monitoring of the 1xEV-DV paging channel and accessing of the 1xEV-DO system by a conventional terminal.

FIG. 4 shows monitoring of the 1xEV-DV paging channel and accessing of the 1xEV-DO system by a conventional hybrid terminal. The conventional terminal stops monitoring the 1xEV-DV paging channel prior to entering the 1xEV-DO access state at time $T_a$ and resumes monitoring the 1xEV-DV paging channel after completing the access procedure and exiting from the 1xEV-DO access state at time $T_b$. The conventional terminal may miss page messages while in the 1xEV-DO access state if the assigned paging slot falls between times $T_a$ and $T_b$, as shown in FIG. 4.

The access probe timeline may be modified to allow a hybrid terminal to perform inter-system tasks while accessing the 1xEV-DO system. Such inter-system tasks may include monitoring the paging channel on another system (e.g., the 1xEV-DV system), making pilot measurements, receiving signaling, or performing some other task on another frequency and/or another system, and so on. The modification to the access probe timeline, as described below, minimally impacts the operation of the hybrid terminal for 1xEV-DO system access and is imperceptible to the 1xEV-DO system.

In an embodiment of the modified access probe timeline, the terminal determines a total probe interval for an access probe to be sent to the 1xEV-DO system, as follows:

$$T_{total} = T_{ap} + \hat{T}_{ack}, \quad \text{Eq (3)}$$

where $T_{ap}$ is the transmission time for the access probe;
$\hat{T}_{ack}$ is an estimated response time for an ACAck message from the 1xEV-DO system for the access probe; and
$T_{total}$ is the total probe interval.

As shown in equation (3), the total probe interval includes the transmission time for the access probe plus the estimated response time for the ACAck message from the 1xEV-DO system. IS-856 requires a base station to send an ACAck message within 96 slots of receiving an access probe. IS-856 requires a terminal to wait at most 128 slots before sending another access probe. The estimated response time $\hat{T}_{ack}$ may be set to a value between 96 and 128 slots (i.e., $128 \geq \hat{T}_{ack} \geq 96$) or to some other value. The value for $\hat{T}_{ack}$ may be determined based on field measurements, computer simulation, and so on.

The terminal transmits the access probe such that the total probe interval does not overlap a tune-away interval, which is a time interval in which the terminal needs to tune the receiver to another system. The tune-away interval may correspond to an assigned paging slot on the 1xEV-DV system, pilot or signaling transmission from another system, or some other event. The terminal transmits the access probe starting in an access channel cycle that meets the probe transmission criterion, which is non-overlapping of the total probe interval with a tune-away interval. This starting access channel cycle may be determined in various manners.

In a first scheme for determining the starting access channel cycle, the terminal first determines the random wait duration (if any) for the access probe in the normal manner, as specified by IS-856 and described above. The terminal then determines whether any portion of the total probe interval overlaps a tune-away interval. If the answer is yes, then the terminal either delays or advances the transmission of the access probe such that the total probe interval does not overlap a tune-away interval.

For the first access probe in the first access probe sequence, the terminal may transmit this access probe in the access channel cycle immediately after the tune-away interval. For each subsequent access probe in the first access probe sequence, the terminal may add $N_a$ slots to the random wait duration $T_p$, where $N_a$ is selected such that the total probe interval does not overlap the tune-away interval. $N_a$ may be the minimum number of slots that meets the probe transmission criterion. Alternatively, if $T_p > T_{ack\_max} + T_{total}$, then the terminal may subtract $N_b$ slots from the random wait duration $T_p$, where $N_b$ is selected such that the total probe interval does not overlap the tune-away interval. For the first access probe in each subsequent access probe sequence, the terminal may add $N_a$ slots to the inter-sequence random wait duration $T_s$ or alternatively subtract $N_b$ slots from $T_s$ such that the total probe interval does not overlap the tune-away interval. Each subsequent access probe may be transmitted in the same manner.

Figure 5:
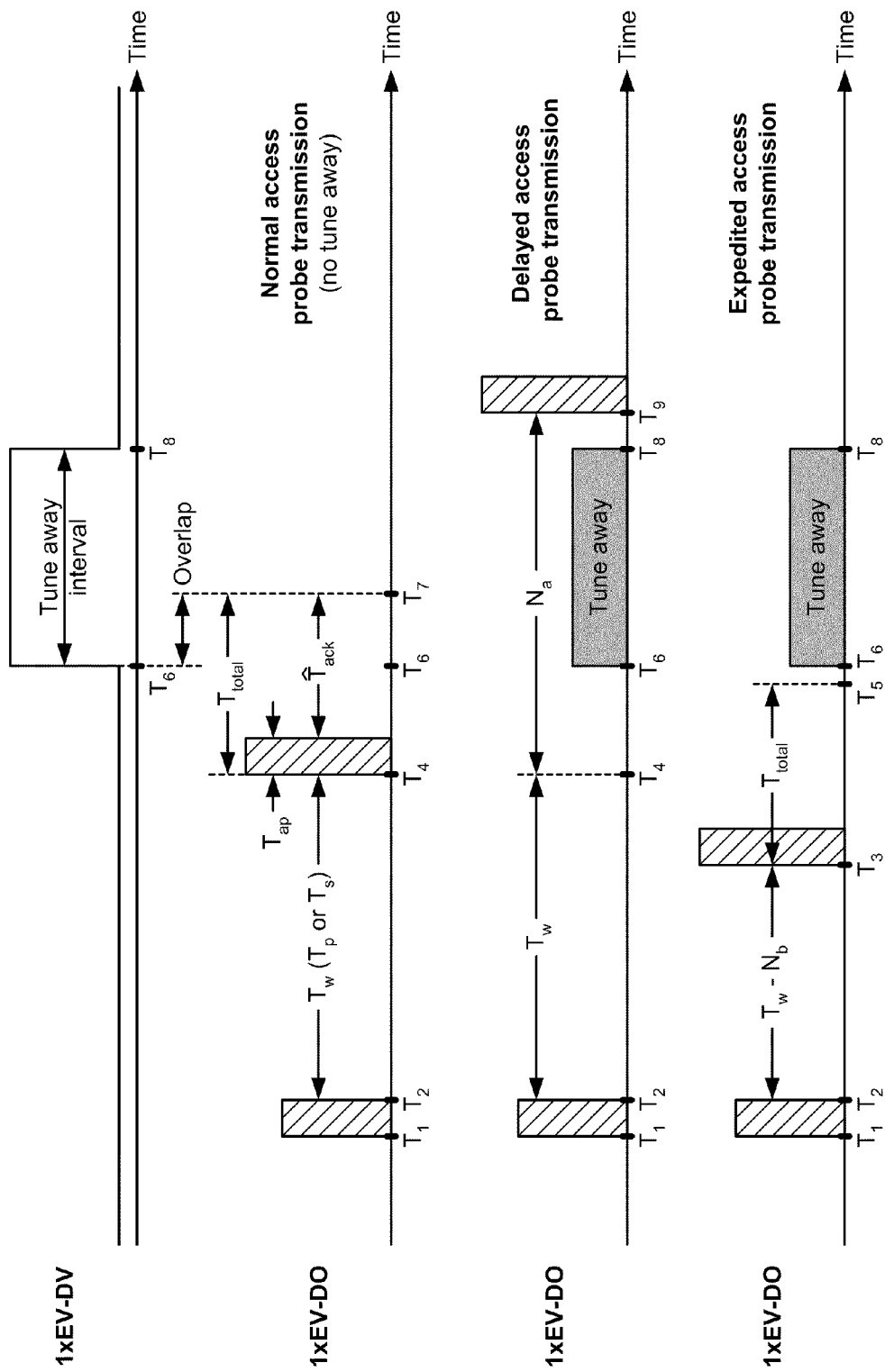
FIG. 5 shows transmission of access probes with tune-away capability.

FIG. 5 shows transmission of access probes with tune-away capability. The terminal transmits a first access probe at time $T_1$ and does not receive an ACAck message for this access probe. The terminal then determines a random wait duration $T_w$ for a second access probe, where $T_w$ may be either $T_s$ or $T_p$. The terminal next determines the total probe interval $T_{total}$ for the second access probe, as shown in equation (3). This total probe interval occurs between times $T_4$ and $T_7$, where $T_4$ is $T_w$ slots after the end of the first access probe at time $T_2$. The terminal needs to tune away between times $T_6$ and $T_g$, which is the tune-away interval. Since the total probe interval overlaps the tune-away interval between times $T_6$ and $T_7$, the terminal may either delay or expedite the transmission of the second access probe.

To delay the transmission of the second access probe, the terminal adds $N_a$ slots to the random wait duration $T_w$, where $N_a$ is selected such that $T_2 + T_w + N_a \geq T_8$. The wait duration then becomes $T_{wa} = T_w + N_a$. The terminal may tune away to another system at time $T_6$, perform the necessary task, tune back to the 1xEV-DO system at time $T_8$, and transmit the second access probe at time $T_9$, which is after time $T_8$.

To expedite the transmission of the second access probe, the terminal subtracts $N_b$ slots from the random wait duration $T_w$, where $N_b$ is selected such that $T_2 + T_w - N_b + T_{total} \leq T_6$. The terminal then transmits the second access probe at time $T_3$, which is $T_w - N_b$ slots after the end of the first access probe and is at least $T_{total}$ prior to the start of the tune-away interval at time $T_6$. The terminal completes the transmission of the second access probe and the waiting for the ACAck message at time $T_5$, which is before time $T_6$. The terminal may then tune away to another system at time $T_6$, perform the necessary task, and tune back to the 1xEV-DO system at time $T_8$.

In a second scheme for determining the starting access channel cycle, the terminal delays the transmission of the first access probe and determines the random wait duration for each subsequent access probe by taking into account a tune-away interval in similar manner as a silence interval. For the first access probe in the first access probe sequence, the terminal may transmit this access probe starting in the access channel cycle immediately after any silence interval and any tune-away interval. For each subsequent access probe in the first access probe sequence, the terminal generates a pseudo-random number y and computes the random wait duration $T_p$, as shown in equation (2). The terminal then determines whether (1) the probe transmission interval overlaps a silence interval or (2) the total probe interval overlaps a tune-away interval. If either condition (1) or (2) is true, then the terminal generates a new pseudo-random number y, adds this new y to the current $y_{total}$, and computes the new random wait duration $T_p$. The terminal continues to increase the wait duration $T_p$ until (a) the probe transmission interval does not overlap a silence interval and (b) the total probe interval does not overlap a tune-away interval. The terminal then transmits the next access probe $T_p$ slots after the end of the prior access probe.

The terminal computes the random wait duration $T_s$ between access probe sequences in the same manner. The terminal continues to increase the wait duration $T_s$ until (a) the probe transmission interval does not overlap a silence interval and (b) the total probe interval does not overlap a tune-away interval. The terminal then transmits the first access probe in the new sequence $T_s$ slots after the end of the last access probe in the prior sequence.

The second scheme results in delayed transmission of an access probe if the total probe interval overlaps a tune-away interval. However, the access probe is transmitted starting in an access channel cycle that is some pseudo-random number of slots from the end of the tune-away interval, instead of in the access channel cycle immediately after the end of the tune-away interval.

Figure 6:
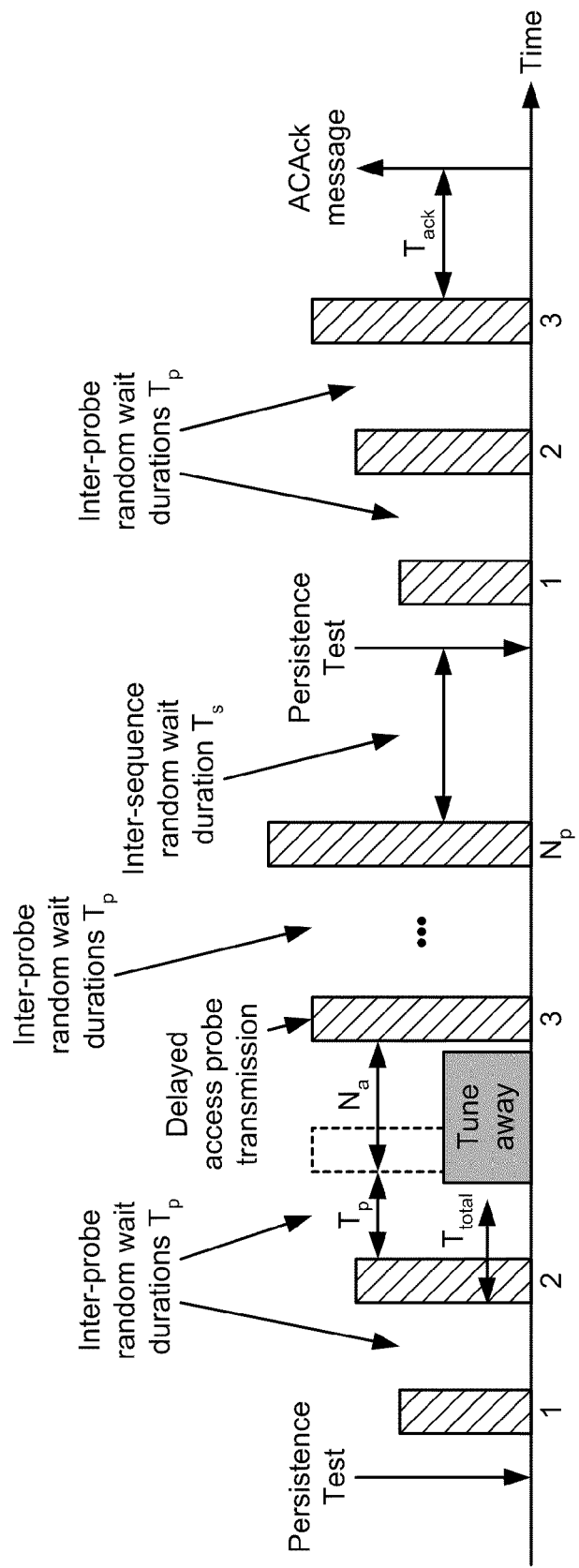
FIG. 6 shows a timeline for an access procedure with tune-away capability.

FIG. 6 shows an example for accessing the 1xEV-DO system and monitoring the 1xEV-DV paging channel by a hybrid terminal with the modified access probe timeline. In the first access probe sequence, the terminal transmits the first and second access probes in the normal manner and does not receive an ACAck message. For the third access probe, the terminal determines the random wait duration $T_p$ and the total probe interval, realizes that the total probe interval overlaps the tune-away interval, and hence delays the transmission of the third access probe by $N_a$ slots. The access probe transmission without the delay is shown by a dashed box in FIG. 6. Delaying the transmission of the third access probe allows the terminal to tune away to monitor the 1xEV-DV paging channel. The transmission of subsequent access probes proceeds in the normal manner without the need to delay any of these access probes.

As shown in FIG. 6, the modified access probe timeline allows the terminal to tune away and monitor another system with a short interruption in the access procedure. Without the tune away capability, the terminal would not be able monitor the 1xEV-DV paging channel during 1xEV-DO system access and may miss page messages. The tune away capability may significantly reduce the missed page rate due to 1xEVDO system access.

For the embodiment described above, an access probe is transmitted such that the total probe interval does not overlap any portion of a tune-away interval. This restriction may be relaxed if the terminal does not need to transmit to the 1xEV-DV system and only needs to time division multiplex the receiver between monitoring the 1xEV-DV system for page messages and the 1xEV-DO system for an ACAck message.

In another embodiment of the modified access probe timeline, the terminal transmits an access probe such that the expected response time does not overlap a tune-away interval. For this embodiment, the probe transmission time may overlap a tune-away interval since the terminal can transmit to the 1xEV-DO system and concurrently receive from the 1xEV-DV system. For the delayed access probe transmission example shown in FIG. 5, the second access probe may be transmitted starting earlier than time $T_8$ and completing at or after time $T_9$.

In the description above, the terminal delays or expedites the transmission of an access probe if the total probe interval (or the expected response time) overlaps a tune-away interval. The terminal may also terminate the access procedure and exit the 1xEVDO access state if the tune-away interval exceeds a predetermined duration (e.g., 500 ms). The terminal may provide a failure indication upon exiting the 1xEVDO access state.

Figure 7:
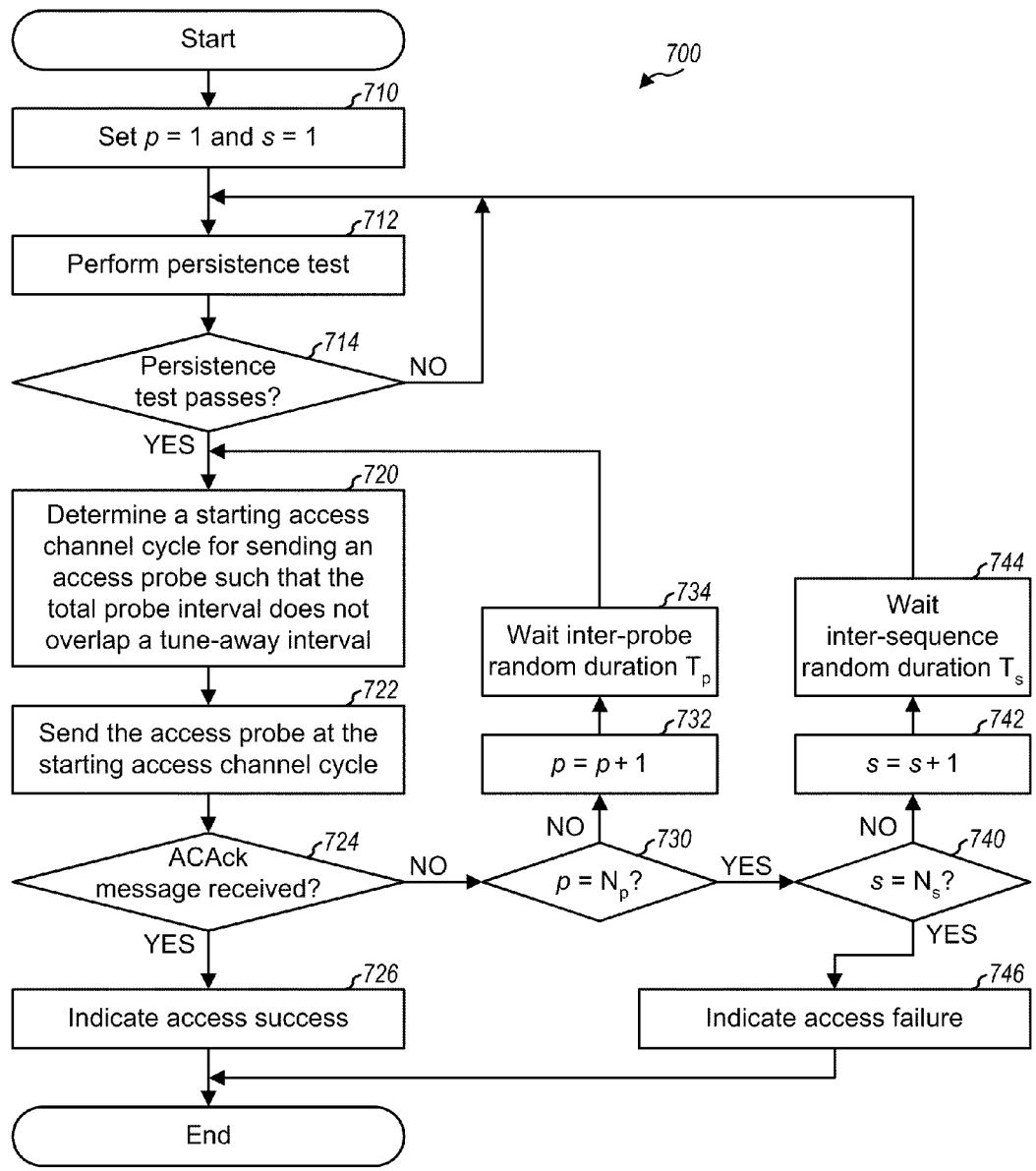
FIG. 7 shows a process for accessing the 1xEV-DO system with tune-away capability to the 1xEV-DV system.

FIG. 7 shows a process 700 performed by a hybrid terminal for accessing the 1xEV-DO system with tune-away capability. Process 700 is for the embodiment in which the terminal delays or expedites the transmission of an access probe such that the total probe interval does not overlap a tune-away interval.

Initially, the terminal sets a variable s for the current access probe sequence to one and a variable p for the current access probe to one (block 710). Prior to starting a new access probe sequence, the terminal performs a persistence test (block 712). A determination is then made whether (1) the persistence test succeeds or (2) the number of consecutive unsuccessful persistence tests exceeds 4/q (block 714). If both conditions are false and the answer is 'No' for block 714, then the terminal returns to block 712 to perform another persistence test. Otherwise, if either condition is true and the answer is 'Yes' for block 714, then the terminal proceeds to block 720 and starts the new access probe sequence.

Prior to transmitting a new access probe, the terminal determines a starting access channel cycle for sending the access probe such that the total probe interval does not overlap a tune-away interval (block 720). This starting access channel cycle may be determined based on the first or second scheme described above or in some other manner. The terminal then sends the new access probe at the starting access channel cycle (block 722). After transmitting the access probe, the terminal waits for an ACAck message. If an ACAck message is received, as determined in block 724, then the terminal terminates the access procedure with a success indication (block 726). Otherwise, if an ACAck message is not received after $\hat{T}_{ack}$ slots from the end of the access probe, then a determination is made whether the maximum number of access probes has been sent for the current access probe sequence, i.e., whether $p=N_p$ (block 730). If the answer is 'No', then variable p is incremented (block 732). The terminal then determines the inter-probe random wait duration $T_p$ and waits this duration (block 734). The terminal then returns to block 720 to transmit a new access probe for the current access probe sequence.

If the maximum number of access probes has been sent for the current access probe sequence and the answer is 'Yes' for block 730, then a determination is made whether the maximum number of access probe sequences has been sent, i.e., whether $s=N_s$ (block 740). If the answer is 'No', then variable s is incremented (block 742). The terminal then determines the inter-sequence random wait duration $T_s$ and waits this duration (block 744). The terminal then returns to block 712 to perform a persistence test prior to initiating a new access probe sequence. Back in block 740, if the maximum number of access probe sequences has been sent and the answer is 'Yes', then the terminal terminates the access procedure with a failure indication (block 746).

For clarity, the access techniques with tune-away capability have been described specifically for 1xEV-DV and 1xEV-DO systems. These techniques may be used for other wireless communication systems such as, for example, a W-CDMA system, a GSM system, a wireless local area network (WLAN) such as an IEEE 802.11 network, an Orthogonal Frequency Division Multiple Access (OFDMA) system, and so on. These techniques allow a terminal to access a system while performing tasks for one or more other systems. For example, the terminal may access the 1xEV-DO system while monitoring a paging channel in the 1xEV-DV system, making pilot measurement in a W-CDMA system and/or a GSM system, and so on.

Figure 8:
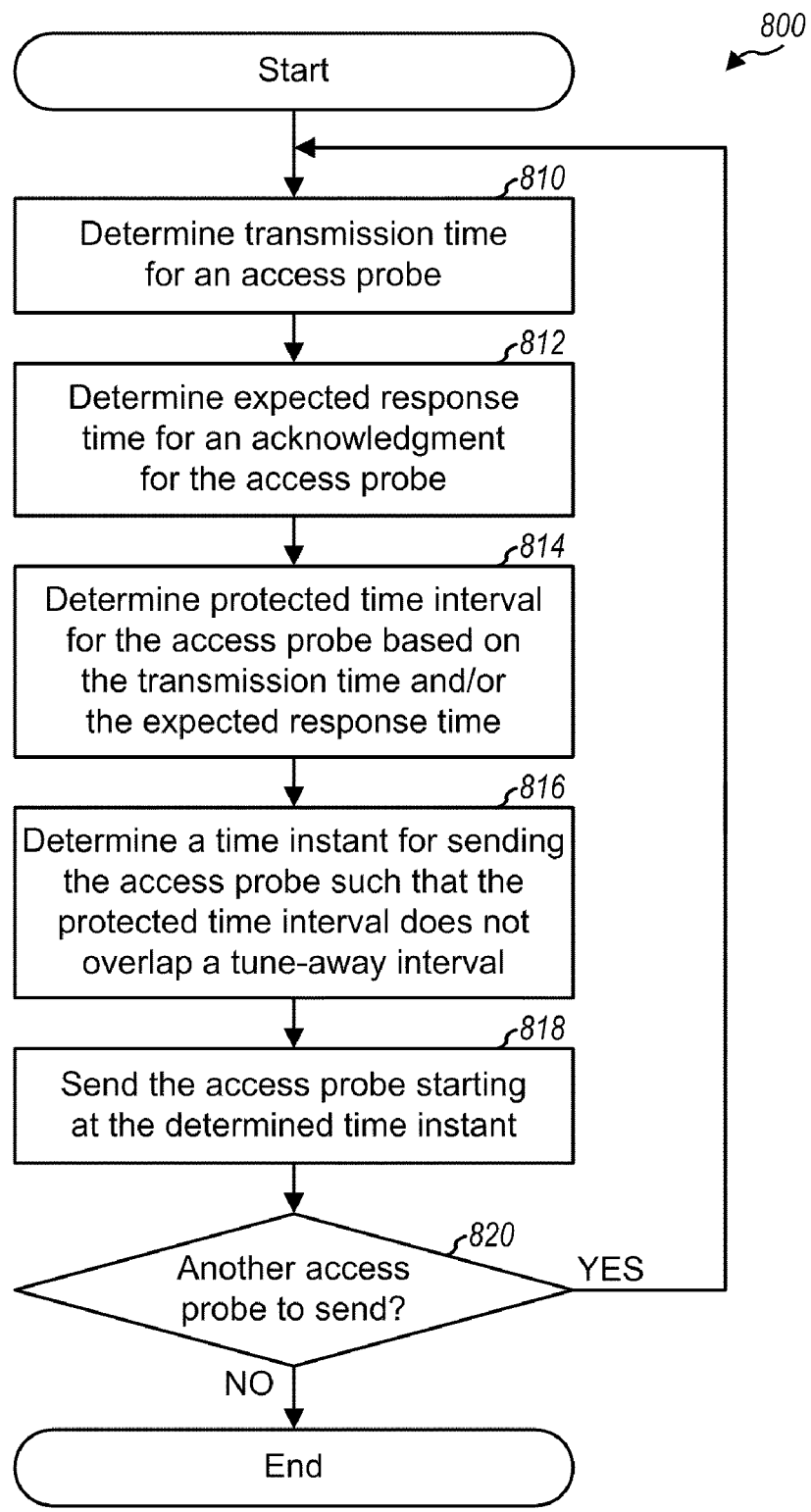
FIG. 8 shows a process for accessing a system with tune-away capability.

FIG. 8 shows a process 800 performed by a hybrid terminal for accessing a first communication system (e.g., a 1xEV-DO system) with tune-away capability to a second communication system (e.g., a 1xEV-DV system). The terminal determines a transmission time for an access probe to be sent to the first system (block 810) and an expected response time for an acknowledgment from the first system for the access probe (block 812). The terminal then determines a protected time interval for the access probe based on the transmission time and/or the expected response time (block 814). The protected time interval is the time interval in which the receiver is tuned to the first system and may be between (1) the expected response time and (2) the transmission time plus the expected response time.

The terminal then determines a starting time for sending the access probe such that the protected time interval does not overlap a tune-away interval (block 816). This starting time may be set initially to the end of a prior access probe plus a pseudo-random wait duration. This starting time may be advanced forward or moved backward in time, if needed, by a time duration selected such that the protected time interval does not overlap a tune-away interval. The terminal then sends the access probe to the first system at the starting time (block 818). The terminal returns to block 810 if another access probe is to be sent, as determined in block 820, and terminates the process otherwise.

Figure 9:
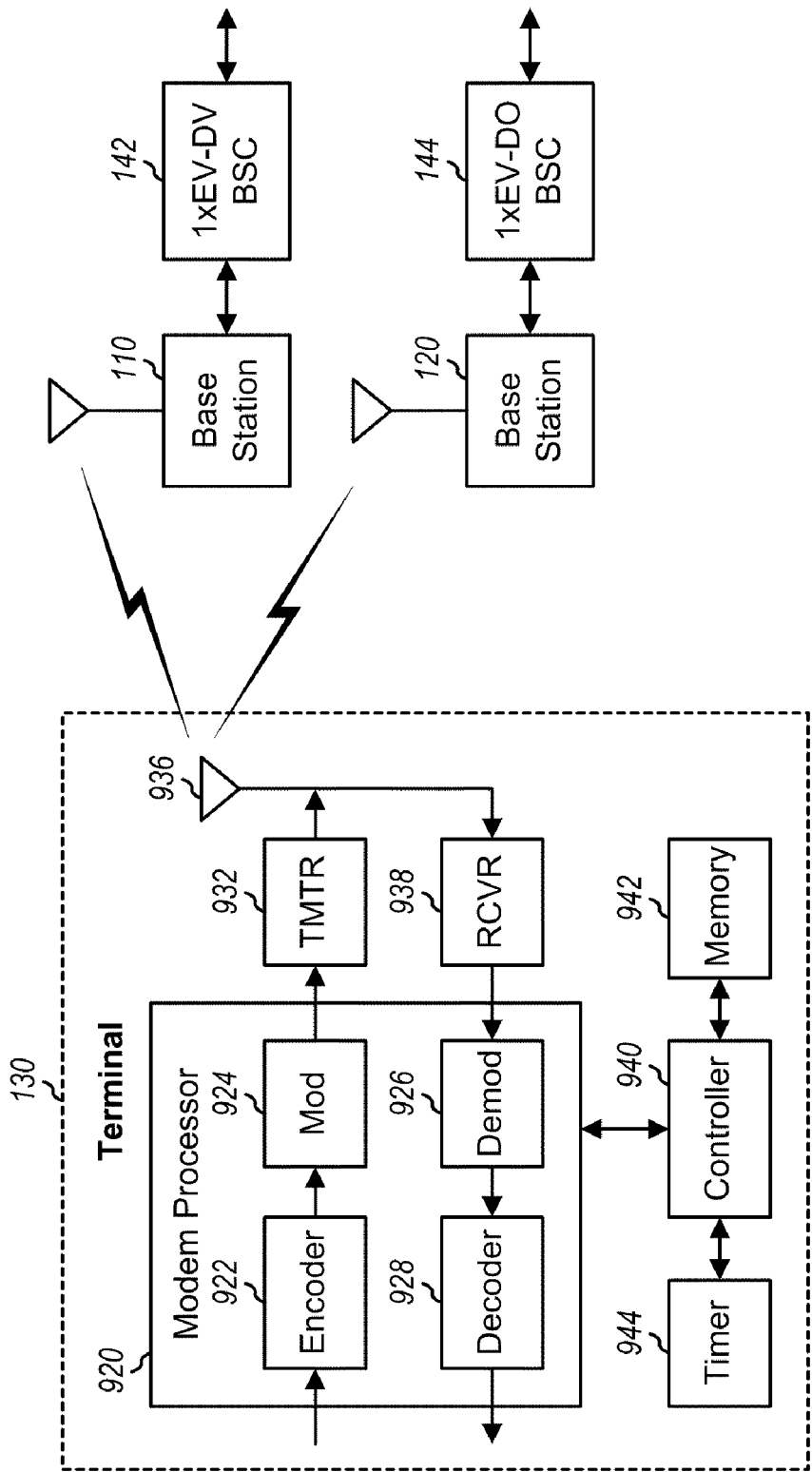
FIG. 9 shows a block diagram of a hybrid terminal.

FIG. 9 shows a block diagram of an embodiment of a hybrid terminal 130. Terminal 130 includes a wireless modem for communication with multiple systems (e.g., 1xEV-DV and 1xEV-DO systems), a controller 940, a memory 942, and a timer 944. On the transmit path, data and signaling to be sent by terminal 130 are processed (e.g., formatted, encoded, and interleaved) by an encoder 922 and further processed (e.g., modulated, spread, channelized, and scrambled) by a modulator (Mod) 924 to generate a stream of data chips. A transmitter unit (TMTR) 932 conditions (e.g., converts to analog, filters, amplifies, and frequency upconverts) the data chip stream to generate a reverse link signal, which is transmitted via an antenna 936. On the receive path, forward link signals transmitted by base stations in the systems are received by antenna 936 and provided to a receiver unit (RCVR) 938. Receiver unit 938 conditions (e.g., filters, amplifies, frequency downconverts, and digitizes) the received signal to generate data samples. A demodulator (Demod) 926 processes (e.g., descrambles, despreads, channelizes, and demodulates) the data samples to obtain symbol estimates. A decoder 928 further processes (e.g., deinterleaves and decodes) the symbol estimates to obtain decoded data. Encoder 922, modulator 924, demodulator 926, and decoder 928 may be implemented by a modem processor 920 and may be provided on a single application specific integrated circuit (ASIC) along with, e.g., the controller 940, memory 942, and timer 942. These units perform processing as specified by the systems.

Controller 940 directs the operation of various units within terminal 130. Memory unit 942 stores program codes and data used by controller 940 and other units. Timer 944 provides timing information used to determine when to send access probes to one system (e.g., the 1xEV-DO system) and when to tune away to another system (e.g., the 1xEV-DV system). Controller 940 may implement process 700 in FIG. 7 to access the 1xEV-DO system while monitoring the 1xEV-DV system or process 800 shown in FIG. 8.

The access techniques with tune-away capability described herein may be implemented by various means. For example, these techniques may be implemented in hardware, software, or a combination thereof. For a hardware implementation, the processing units used to access one system, monitor another system, and so on may be implemented within one or more ASICs, digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the access techniques with tune-away capability may be implemented with modules (e.g., procedures, functions, and so on) that perform the functions described herein. The software codes may be stored in a memory unit (e.g., memory unit 942 in FIG. 9) and executed by a processor (e.g., controller 940). The memory unit may be implemented within the processor or external to the processor.

Various modifications to the described embodiments will be readily apparent to those skilled in the art, and the generic principles defined herein may be applied to other embodiments without departing from the spirit or scope of the invention.

What is claimed is:

1. A processor comprising:
a first module for causing a computer to determine a protected time interval required after an access request is sent to a first communication system, wherein the first communication system is entitled to respond anytime within the protected time interval;
a second module, comprising hardware, for causing the computer to determine a starting time for sending the access request such that the protected time interval does not overlap a tune-away interval; and
a third module for causing the computer to initiate sending the access request to the first communication system at the starting time.

2. The processor of claim 1, further comprising a module for causing the computer to tune a receiver to the first communication system during the protected time interval and to tune away from the first communication system during the tune-away interval.

3. The processor of claim 2, further comprising a module for causing the computer to direct the receiver to tune to a second communication system prior to the tune-away interval and to direct the receiver to tune back to the first communication system after the tune-away interval.

4. The processor of claim 3, further comprising a module for causing the computer to receive a paging channel from the second communication system during the tune-away interval.

5. The processor of claim 1, further comprising a module for causing the computer to determine an expected response time for an acknowledgment from first communication system for the access request, and determine the protected time interval based on the expected response time.

6. The processor of claim 1, further comprising a module for causing the computer to determine a transmission time for the access request, wherein the first module determines the protected time interval further based on the transmission time.

7. The processor of claim 1, further comprising a module for causing the computer to determine an initial time for sending the access request, and wherein the second module determines the starting time as the initial time plus or minus a zero or non-zero time duration selected such that transmission of the access request at the starting time results in the protected time interval not overlapping the tune-away interval.

8. The processor of claim 7, further comprising a module for causing the computer to determine a pseudo-random wait duration and to set the initial time to the end of a prior access request plus the pseudo-random wait duration.

9. The processor of claim 1, further comprising a module for causing the computer to initialize the starting time to the end of a prior access request, to determine a pseudo-random wait duration, to advance the starting time by the pseudo-random wait duration, and to repeat determining a pseudo-random wait duration and advancing the starting time until transmission of the access request at the starting time results in the protected time interval not overlapping the tune-away interval.

10. The processor of claim 1, wherein the tune-away interval corresponds to an assigned paging slot for a second communication system.

11. The processor of claim 1, wherein the tune-away interval corresponds to a pilot transmission or a signaling transmission from a second communication system.

12. The processor of claim 1, wherein the tune-away interval corresponds to a measurement interval for a second communication system.

13. A processor comprising:
a first module, comprising hardware, for determining a protected time interval required after an access request is sent to a data only communication system, wherein the data only communication system is entitled to respond within the protected time interval, wherein the protected time interval is a time interval in which a receiver is tuned to the data only communication system;
a second module for determining a starting access channel cycle for sending the access request such that the protected time interval does not overlap a tune-away interval, wherein the tune-away interval is a time interval in which the receiver is tuned to a data and voice communication system; and
a third module for sending the access request to the data only communication system at the starting access channel cycle.

14. The processor of claim 13, wherein the first module determines the protected time interval at least in part by determining a transmission time for the access request, determining an expected response time for an acknowledgement from the data only communication system for the access request, and setting the protected time interval based on the transmission time and the expected response time.

15. The processor of claim 13, wherein the second module determines the starting access channel cycle at least in part by determining a pseudo-random wait duration, setting the starting access channel cycle to a first access channel cycle located after an end of a prior access request plus the pseudo-random wait duration, and selecting a second access channel cycle as the starting access channel cycle where transmission of the access request at the first access channel cycle results in the protected time interval overlapping the tune-away time interval.

16. The processor of claim 15, wherein the second access channel cycle occurs after the first access channel cycle.

17. The processor of claim 13, further comprising:
a fourth module for tuning the receiver to the data and voice communication system prior to the tune-away interval;
a fifth module for receiving a paging channel from the data and voice communication system; and
a sixth module for tuning the receiver back to the data only communication system after the tune-away interval.

18. A memory unit including machine-executable instructions to cause a processor in a wireless device to:
determine a protected time interval required after an access request is sent to a data only communication system, wherein the data only communication system is entitled to respond within the protected time interval, wherein the protected time interval is a time interval in which a receiver is tuned to the data only communication system;
determine a starting access channel cycle for sending the access request such that the protected time interval does not overlap a tune-away interval, wherein the tune-away interval is a time interval in which the receiver is tuned to a data and voice communication system; and
send the access request to the data only communication system at the starting access channel cycle.

19. The memory unit of claim 18, wherein the instructions cause the processor in the wireless device to determine the protected time interval at least in part by determining a transmission time for the access request, determining an expected response time for an acknowledgement from the data only communication system for the access request, and setting the protected time interval based on the transmission time and the expected response time.

20. The memory unit of claim 18, wherein the instructions cause the processor in the wireless device to determine the starting access channel cycle at least in part by determining a pseudo-random wait duration, set the starting access channel cycle to a first access channel cycle located after an end of a prior access request plus the pseudo-random wait duration, and select a second access channel cycle as the starting access channel cycle where transmission of the access request at the first access channel cycle results in the protected time interval overlapping the tune-away time interval.

21. The memory unit of claim 18, wherein the instructions cause the processor in the wireless device to tune the receiver to the data and voice communication system prior to the tune-away interval, receive a paging channel from the data and voice communication system, and tune the receiver back to the data only communication system after the tune-away interval.

22. An apparatus, comprising:
means for determining a protected time interval required after an access request is sent to a data only communication system, wherein the data only communication system is entitled to respond within the protected time interval, wherein the protected time interval is a time interval in which a receiver is tuned to the data only communication system;
means for determining a starting access channel cycle for sending the access request such that the protected time interval does not overlap a tune-away interval, wherein the tune-away interval is a time interval in which the receiver is tuned to a data and voice communication system; and
means for sending the access request to the data only communication system at the starting access channel cycle.

23. The apparatus of claim 22, wherein the means for determining the protected time interval comprises:
means for determining the protected time interval at least in part by determining a transmission time for the access request;
means for determining an expected response time for an acknowledgement from the data only communication system for the access request; and
means for setting the protected time interval based on the transmission time and the expected response time.

24. The apparatus of claim 22, wherein the means for determining the starting access channel cycle comprises:
means for determining the starting access channel cycle at least in part by determining a pseudo-random wait duration;
means for setting the starting access channel cycle to a first access channel cycle located after an end of a prior access request plus the pseudo-random wait duration; and
means for selecting a second access channel cycle as the starting access channel cycle where transmission of the access request at the first access channel cycle results in the protected time interval overlapping the tune-away time interval.

25. The apparatus of claim 22, further comprising:
means for tuning the receiver to the data and voice communication system prior to the tune-away interval;
means for receiving a paging channel from the data and voice communication system; and
means for tuning the receiver back to the data only communication system after the tune-away interval.

* * * * *